Sept. 11, 1962 W. R. JOHNSON 3,054,108

GRAPHIC RECORDING SYSTEM

Filed June 8, 1959 4 Sheets-Sheet 1

INVENTOR:
Wayne R. Johnson
By Smyth & Roston
Attorneys.

Sept. 11, 1962 W. R. JOHNSON 3,054,108

GRAPHIC RECORDING SYSTEM

Filed June 8, 1959 4 Sheets-Sheet 2

INVENTOR:
Wayne R. Johnson
By Smyth & Roston
Attorneys,

INVENTOR:
Wayne R. Johnson
By Smyth & Roston
Attorneys.

INVENTOR:
Wayne R. Johnson
By Smyth & Roston
Attorneys.

United States Patent Office 3,054,108

Patented Sept. 11, 1962

3,054,108

GRAPHIC RECORDING SYSTEM

Wayne R. Johnson, Los Angeles, Calif., assignor to Minnesota Mining and Manufacturing Company, St. Paul, Minn., a corporation of Delaware Filed June 8, 1959, Ser. No. 818,844
10 Claims. (Cl. 346—74)

This invention relates to oscillographs and, more particularly, to a magnetic transducing system for simultaneously producing a number of visible curves each representing a varying quantity.

An oscillograph is an apparatus for producing a written or visible curve representing variable current, voltage or other electrical quantities. In one such apparatus, electrical oscillations in a circuit cause electro-magnetic vibrations of a filament bearing a mirror which reflects a light-beam onto a moving photographic film. Other oscillographs utilize a slave coil which carries a pen to record the magnitude of the varying signal on a moving paper chart. Some apparatus which provide a visible indication of a varying electrical quantity utilize cathode ray tubes and are generally referred to as oscilloscopes even when a recording is produced.

In a specific illustrative embodiment of this invention, photographic equipment, inking pens and optical systems, with their accompanying limitations of slow speed and complexity are not required to provide a graphic representation of varying electrical quantities. The illustrative embodiment includes a single magnetic transducer head which simultaneously records a number of curves representing respectively a number of varying electrical quantities on a moving magnetic medium. Duplication of recording equipment such as inking pens, optical systems, cathode ray tubes, etc., for each of the varying quantities is not required to simultaneously produce the curves and to provide a visible image of the simultaneously produced curves.

The magnetic transducer head which is a travelling wave transducer head of the type disclosed and claimed in my copending patent application Serial No. 733,765, filed on May 5, 1958, transversely records signals derived from the input varying quantities on successive transverse tracks of the moving magnetic medium to form thereon a plurality of curves representing the input varying electrical signals. The transducer head which is stationary is provided with a tubular shape disposed in a transverse direction across the recording medium. Transverse recording is achieved even though the transducer head is stationary by exciting longitudinal elastic waves in the head which move transversely with respect to the direction of the movement of the recording medium. The transducer head includes a magnetostrictive tube and the elastic waves, which momentarily relieve stresses normally in the tube so that, in effect, the elastic waves function as enabling waves by locally changing the permeability of the tube.

Each of the input varying signals is periodically sampled at the same time the elastic pulses are excited in the transducer head to record transverse tracks across the magnetic recording medium. The instantaneous magnitudes of the sampled input signals are converted by separate multivibrators to variable duration pulses. The varying duration or width pulses for each of the input signals are differentiated so that the pulses derived at the trailing edge of the varying-width pulses are effectively time position pulses with respect to the successive elastic pulses to indicate the instantaneous magnitude of the associated input varying signal. Each series of differentiated or time position pulses derived from the respective input varying signals is introduced to an individually associated switch which is operated in accordance with a distinctive identifying pattern or code. The identifying pattern is utilized to visibly differentiate between the recorded curves on the recording medium.

The coded series of pulses for the input varying signals, are introduced to the transducer head for recording on the moving recording medium. Depending upon the coding of the different series of pulses, a maximum of one pulse for each of the input signals may be recorded in each transverse track, with the transverse position of each pulse on the recording medium depending upon its time position relative to the pulse which excites the transverse wave in the transducer head. As recorded in the successive transverse tracks, the recorded signals or pulses derived from each of the varying signals form a latent image of a curve representing the input signal.

The curves as recorded on the magnetic tape are coded in accordance with the operation of the switches so as to be readily identified when visible. The curves are made visible when the recording medium is passed through apparatus which coats the magnetized portions of the medium with a magnetic solution. The magnetic solution may be transferred if so desired to printing paper so that a continuous visible print of the coded latent curves on the magnetic tape may be provided.

Further advantages and features of this invention will be apparent upon consideration of the following description read in conjunction with the drawing wherein.

Figure 1:
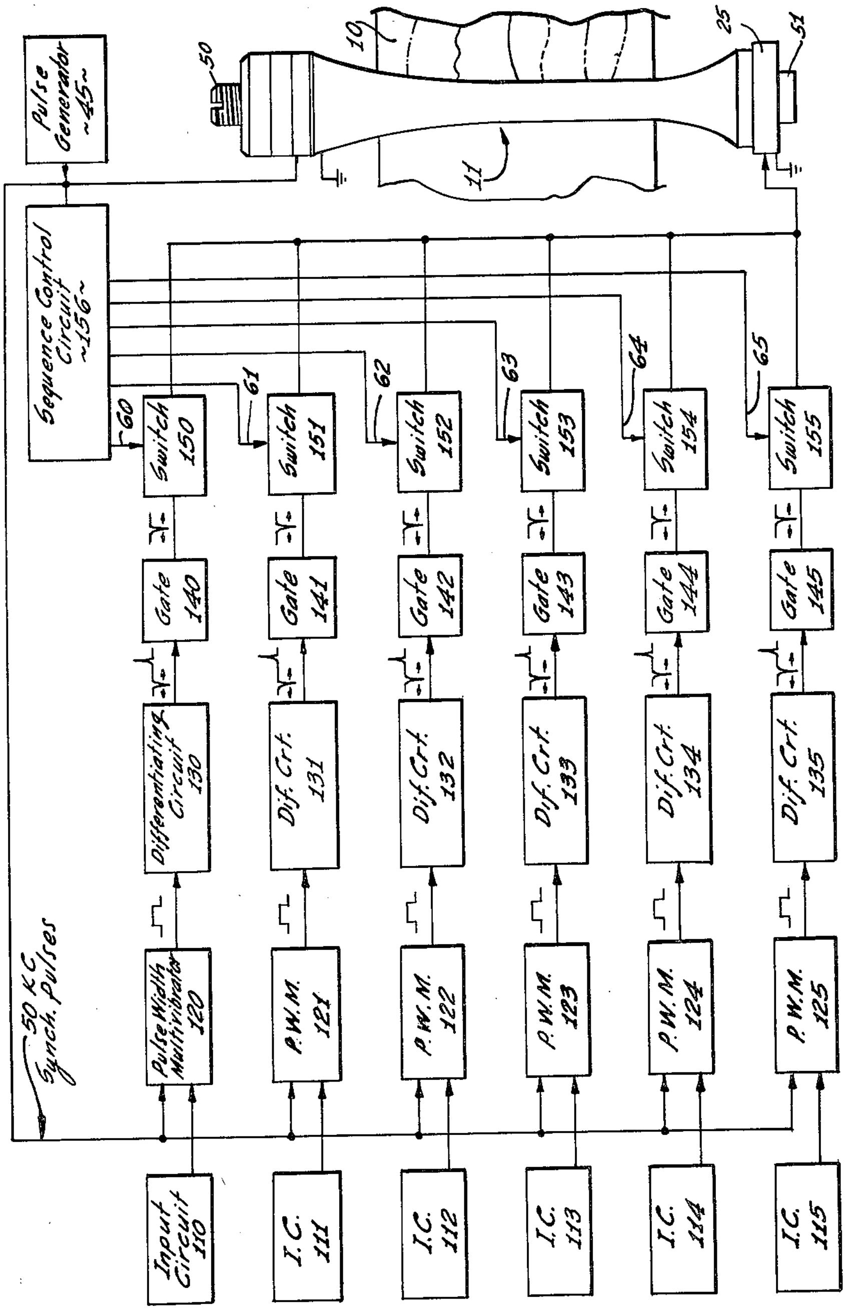
FIGURE 1 is a functional representation of the magnetic oscillograph transducing system of this invention.

The magnetic oscillograph transducing system of this invention, which is functionally depicted in FIGURE 1, continuously records a number of varying electrical signals as curves on a magnetic tape 10. The varying signals which may be six in number are provided respectively from the input circuits 110 through 115 inclusive. Each of the input circuits 110 through 115 may be any electrical or electromechanical apparatus having an output which is a varying electrical signal. The varying electrical signals are provided respectively from the input circuits 110 through 115 to the pulse-width multivibrators 120 through 125. The multivibrators 120 through 125 are trigger circuit arrangements which are simultaneously operated by synchronizing pulses from a pulse generator 45. The output of the multivibrators 120 through 125 are square pulses having a duration depending upon the instantaneous magnitudes of the associated input signals.

The synchronizing pulses which may, for example, be at a repetition rate of 50 kilocycles per second, simultaneously trigger the multivibrators 120 through 125 to effectively convert the instantaneous magnitudes of the varying electrical signals to pulses having durations related thereto. The output of each of the multivibrators 120 through 125, is, therefore a series of pulses initiated at a 50 kilocycle per second rate with each of the pulses having a duration dependent upon the instantaneous magnitude of the associated varying electrical signal. The maximum pulse width may be 18 microseconds which is smaller than the interpulse interval of 20 microseconds between synchronizing pulses from the pulse generator 45. A minimum pulse width duration from the multivibrators 120 through 125 may be 2 microseconds so that each of the pulses from the multivibrators 120 through 125 may have a duration between 2 and 18 microseconds depending upon the instantaneous magnitude of the associated varying input signal at the instant a synchronizing pulse is provided from the generator 45.

The series of varying duration pulses from the multivibrators 120 through 125 are introduced respectively to differentiating circuits 130 through 135, the outputs of which are sharp or short-duration positive and negative pulses for each of the rectangularly shaped pulses from the multivibrator 120 through 125. The differentiated pulses from the circuits 130 through 135 are coupled respectively through gate circuits 140 through 145 which remove the positive pulses derived at the beginning of each of the square shaped pulses from the multivibrators 120 through 125. The output from each of the gate circuits 140 through 145 is, therefore, a series of sharp negative pulses having time positions dependent upon the magnitudes of the input varying signals. In each time slot initiated by a synchronizing pulse from the pulse generator 45, each negative pulse from the gate circuits 140 through 145, inclusive, has a time position from 2 to 18 microseconds after the synchronizing pulse which indicates the instantaneous magnitude of the associated input signal.

Figures 4, 7:
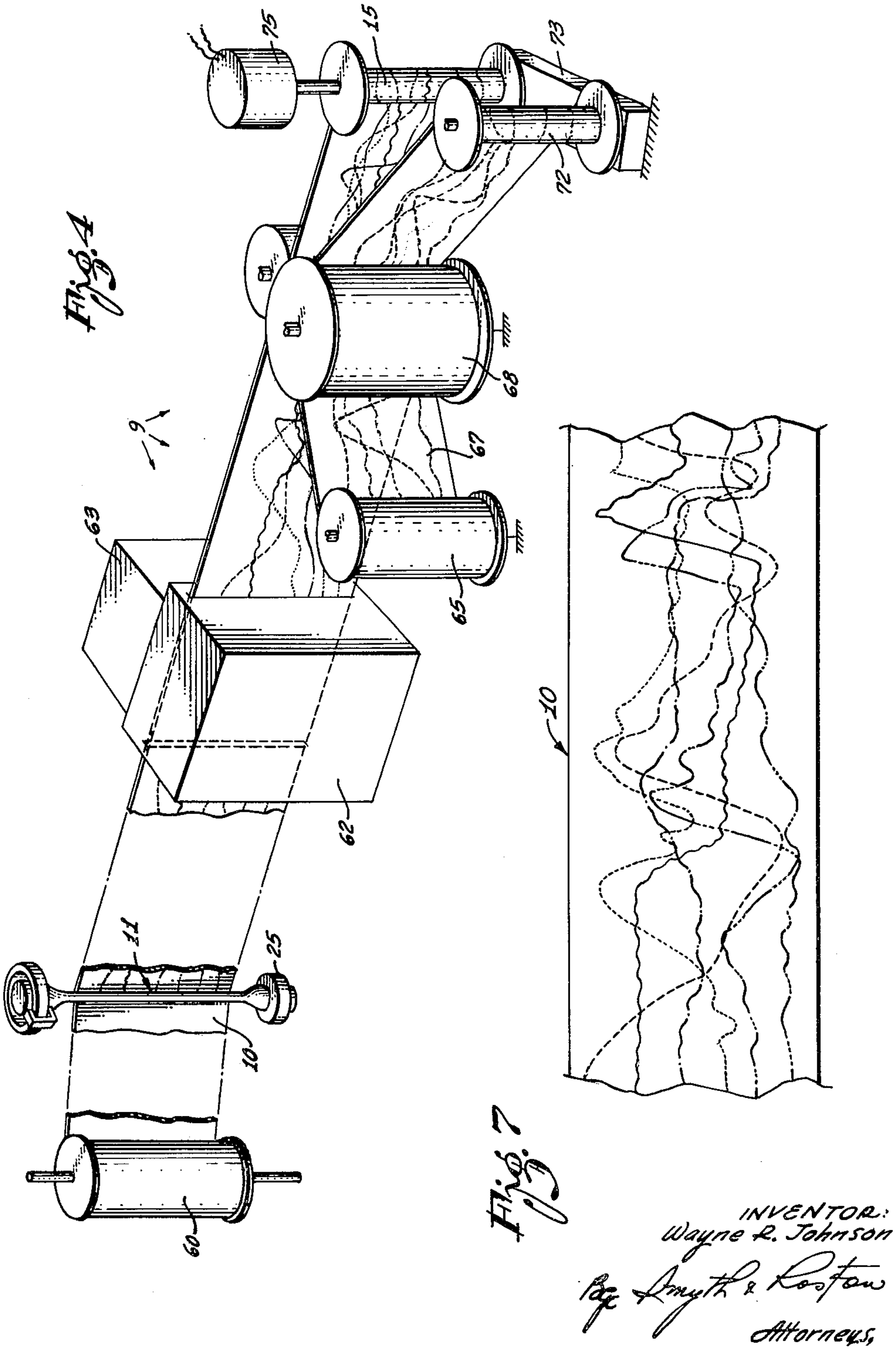
FIGURE 4 is a pictorial view of the printing portion of the reproducing system of this invention.
FIGURE 7 is a top view of a section of the tape 10 illustrating the coded curves as recorded thereon by the transducing system of this invention.

The series of negative pulses, or samples, one for each of the input signals for each synchronizing pulse, are provided respectively from the gate circuits 140 through 145 to six switches 150 through 155. The switches 150 through 155, which may be high speed relays or electronic switches, are controlled by a squence control circuit 156. The squence control circuit 156, which is driven by the pulse generator 45, is coupled respectively to the switches 150 through 155 by means of the control leads 60 through 65. Each of the switches 150 through 155 is controlled in accordance with a unique sequence pattern so that the series of negative pulses introduced thereto are interrupted in a pattern or code unique to the particular input varying signal. As is hereinafter described, this unique pattern is utilized to identify the curves corresponding respectively to the input signals as recorded on the magnetic tape 10. The recorded curves on the magnetic tape 10 are illustrated in FIGURE 7. The pattern to the switch 150, which is illustrated by the curve A in FIGURE 7, may, for example, be that the switch 150 is enabled or permits the passage of negative pulses for an interval of 8 milliseconds and then is inhibited or blocks the negative pulses for the next interval of 2 milliseconds. The output from the switch 150 would, therefore, be a number of series of negative pulses for 8 milliseconds each having a time position related to the instantaneous magnitude of the associated input signals, with each series being followed by a blank interval for 2 milliseconds. A curve B in FIGURE 7 illustrates a continuous recording of pulses which may be the identification of one of the input signals.

Figure 5:
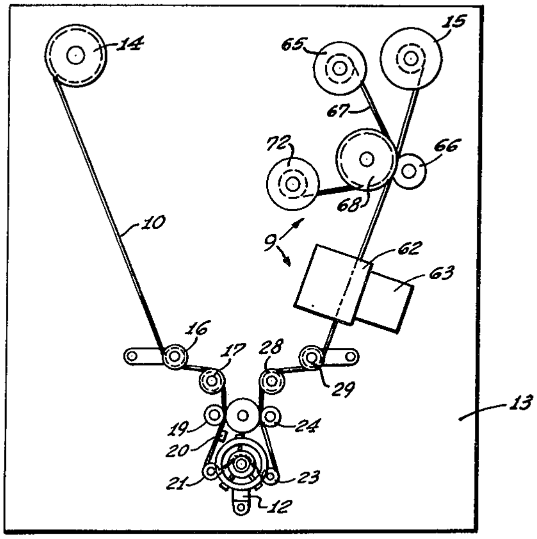
FIGURE 5 is a schematic diagram of equipment for progressing the magnetic tape adjacent the transducer head and through the printing equipment of the magnetic oscillograph transducing system of this invention.

Referring again to FIGURE 1, the coded series of signals from each of the switches 150 through 155 are multipled to a toroidal winding 25 of a transducer head 11 which is positioned adjacent the magnetic tape 10. The transducer head 11 as is described in my copending patent application Serial No. 733,765, filed on May 5, 1958, is briefly described herein because it is an important component in the magnetic oscillograph transducing system of this invention. The transducer head 11, shown particularly in FIGURES 2 and 3, functions as a transverse recording head for the tape 10 which is moved adjacent the stationary transducer head 11. The tape transport equipment, which is illustrated in FIGURE 5, includes a platform 13 supporting the head 11 by a bracket 12. The magnetic tape 10 is driven from a pay-out reel 14 adjacent the transducer head 11 and then through printing equipment 9 to a take-up reel 15. The magnetic tape 10 may be tensioned by individual motors, not shown, which drive the pay-out reels 14 and the take-up reel 15.

From the pay-out reel 14, the magnetic tape 10 passes over a spring actuated tensioning arm 16 about which it turns to pass over a guide post 17. At the post 17, the magnetic tape 10 makes a substantially right angle to pass between a drive capstan 18 and a rubber-nipped roller 19 and then against a cleaning device 20 to another post 21. The post 21 directs the magnetic tape 10 over the transducer head 11 at a particular angle relative to the periphery of the transducer head 11. The magnetic tape 10 from the head 11 to the reel 15 passes along a path which is substantially the image of the path from the reel 14 to the head 11. More specifically, the path from the transducer head 11 is over a post 23 between a nip-roller 24 and the drive capstan 18, post 28 and the spring actuated tensioned arm 29 through inking and printing equipment 9 to the take-up reel 15.

Figures 2, 3:
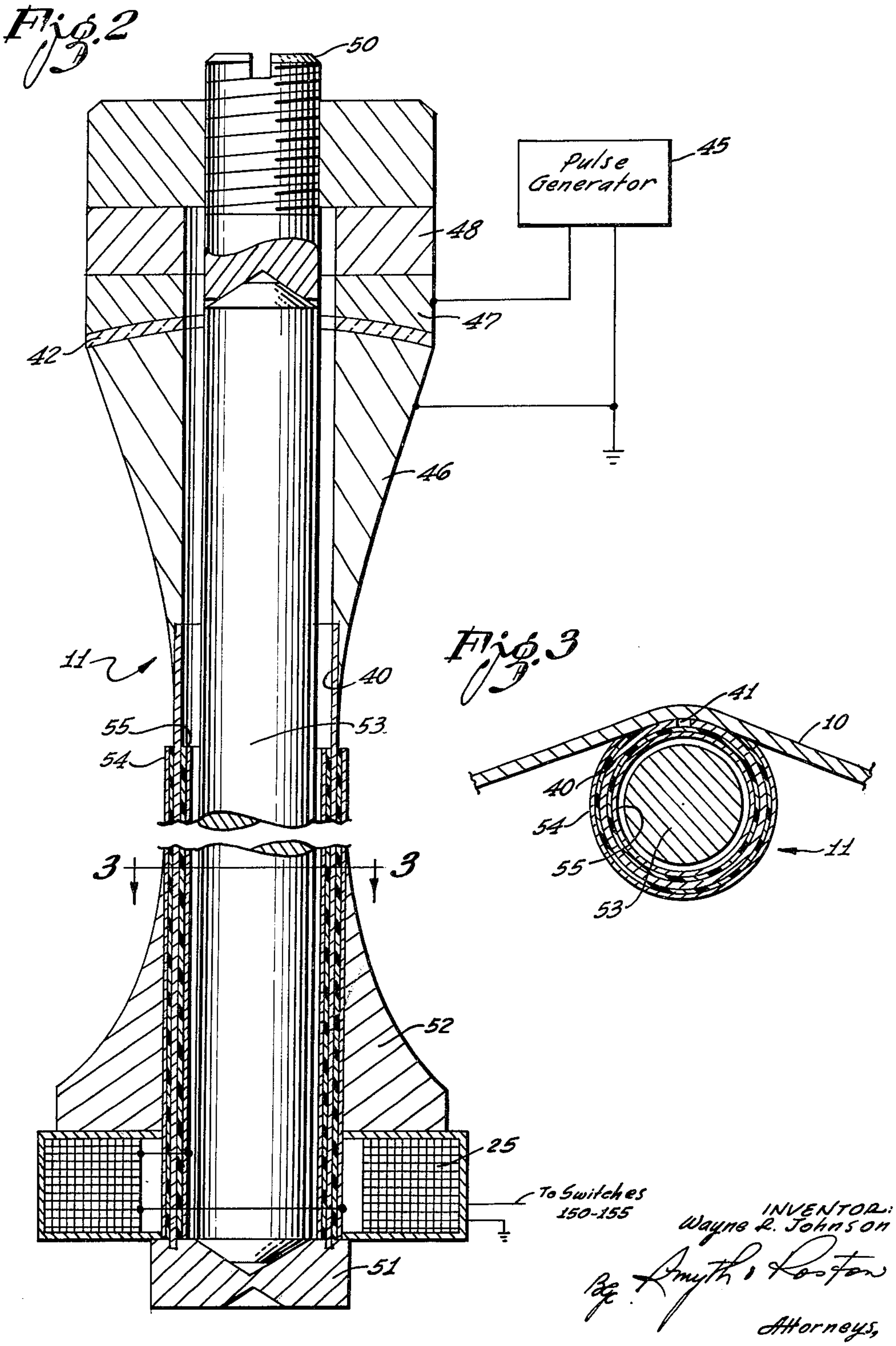
FIGURE 2 is a longitudinal sectional view of the transducer head utilized in the magnetic oscillograph transducing system of this invention.
FIGURE 3 is a sectional view of the transducer head taken along lines 3—3 in FIGURE 2.

As shown particularly in FIGURES 2 and 3, the transducer head 11 includes a tube 40 of magnetostrictive material which changes its magnetic properties with stress. The magnetostrictive tube 40 which may be made of "Permalloy" tape, has a non-magnetic gap 41 extending longitudinally along the tube 40. Elastic waves are transmitted longitudinally through the magnetostrictive tube 40 by a piezoelectric crystal 42 responsive to voltage pulses developed by the pulse amplifier 45. The pulses developed by the amplifier 45 are 0.1 microsecond in duration and have a repetition period illustratively of 50 kilocycles per second.

At one end of the magnetostrictive tube 40, an acoustic transformer section 46 is mounted to couple acoustive waves generated by the piezoelectric crystal 42 to the magnetostrictive tube 40. The other side of the crystal 42 is attached to an annulus 47 which functions as a buttress against which the crystal 42 acts to deliver pulsed energy developed thereby to the acoustic transformer section 46. The annulus 47 is in turn backed by an annulus 48 of insulating material which is a good absorber of sound. The absorbant annulus 48 is in turn secured to a metal cap or nut 49 which is internally threaded to receive an adjusting screw 50.

At the opposite end of the magnetostrictive tube 40, a cap 51, the toroidal coil 25 and an acoustic absorbant section 52 are mounted. The waves generated from the crystal 42 are transmitted or propagated through the acoustic transformer section 46 and the magnetostrictive tube 40 at a speed of approximately 7,500 feet per second to the absorbing section 52. The structure including the magnetostrictive tube 40 is placed in tension by means of a strut 53 extending longitudinally through the tube 40 and bearing at one end in a depression formed in the inner end of the adjusting screw 50 and at the other end in a similar depression in the cap 51.

Figure 6:
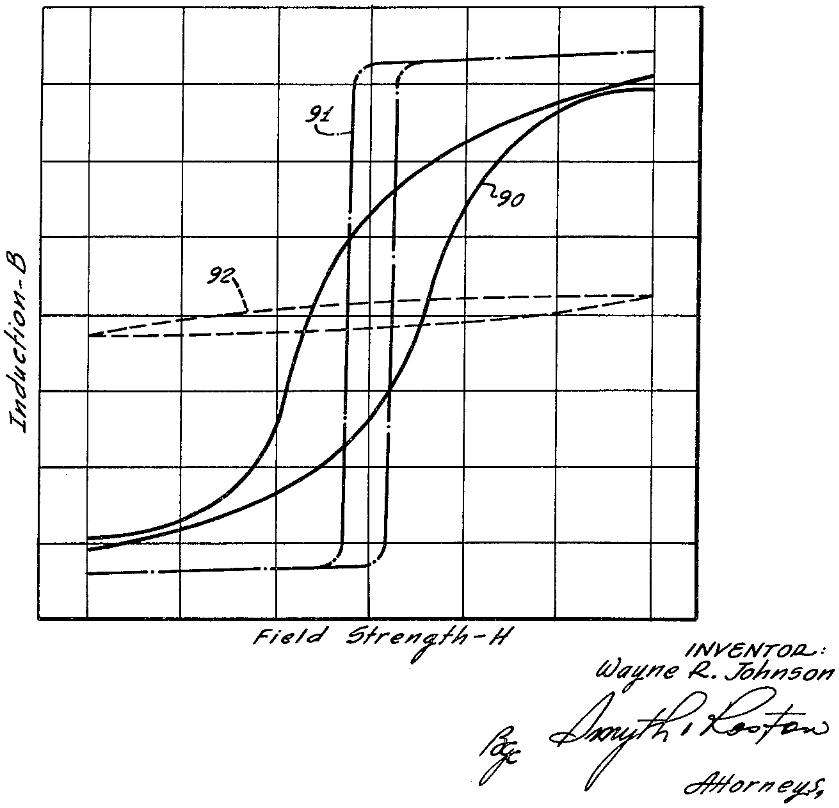
FIGURE 6 is a series of curves illlustrating the magnetic properties of the magnetostrictive tube material under tension and as effected by an elastic wave.

The effect of the stresses applied to the magnetostrictive tube 40 due to the acoustic waves from the piezoelectric crystal 42 are illustrated in FIGURE 6. In FIGURE 6, the hysteresis loop 90 is that of the unstressed tube 40 and the slope of the loop represents its permeability. When the tube 40 is stressed longitudinally due to the effect of the nut 49 on the adjusting screw 50, the shape of the hysteresis loop is changed materially to that of the hysteresis loop 91. The hysteresis loop 91 is nearly rectangular in form having a very steep slope almost to the point of saturation. Circumferentially, however, the effect of the tension causes the slope of the hysteresis loop or the permeability of the tube 40 to approach zero as indicated by the loop 92. In other words, the magnetostrictive tube 40 acts as though it were non-magnetic to circumferential fields. Circumferential fields are induced by a signal winding including the plated sections 54 and 55 which are plated on the exterior and interior respectively of the magnetostrictive tube 40. The elastic pulse is a comparison device which relieves the stresses in the tube 40.

In this manner, a moving recording gap is provided along the acoustic wave which changes the condition of successive positions along the tube 40 from being effectively non-magnetic to being effectively magnetic. When the wave passes, the successive positions return to their normal effectively non-magnetic conditions determined by the applied stresses. At the position of the wave the permeability of the tube 40 is increased. A circumferential field developed by a pulse to the plated sections or windings 54 and 55 is effective of the position of the wave to develop a circumferential field which passes around the gap 41 through the magnetic tape 10.

As indicated above, signals representing samples of the varying signals are multipled to the toroidal winding 25 of the transducer head 11 which is coupled to the plated windings 54 and 55. The sampled signals are very short having a duration of approximately 0.1 microsecond as determined by the differentiating circuits 130 through 135. The transverse elastic pulses through the magnetostrictive tube 40 of the head 11 record the sampled signals at transverse positions on the tape 10 depending upon the timing therebetween. Each transverse pulse records a maximum of six pulses on the magnetic tape 10 depending upon the conditions of six switches 150 through 155 as controlled by the circuit 156. If the magnitude of one of the varying input signals is not varying, the successive negative pulses derived therefrom will have the same position in each of the successive time slots. The successive pulses, therefore, have the same time reference with respect to each of the elastic pulses in the transducer head 11 so that the successive transverse pulses in the head 11 function to record the successive pulses on the magnetic tape 10 to form a longitudinal line. The transverse location of the recorded pulses varies in accordance with the time positions of the developed pulses and, therefore with the magnitude of the associated input electrical signal. As the successive transverse tracks are recorded, each including a maximum of six pulses, one for each of the input varying signals in accordance with the instantaneous conditions of switches 150 through 155, six magnetic curves are simultaneously formed on the magnetic tape 10. The curves are effectively pieced together pulse after pulse as the successive transverse tracks are recorded. The operating sequence of the switches 150 through 155 provides for a different combination of recording and blanking intervals for each curve so that the latent recorded curves on the magnetic tape 10, as illustrated in FIGURE 7, are differently coded.

To briefly recapitulate, two conditions are necessary for recording on the tape 10: first, the pulse to be recorded must be introduced to the plated windings 54 and 55; and second, a shock wave must be initiated through the magnetostrictive tube 40. The shock wave functions as a moving recording gap along the gap 41 travelling from one end of the tube 40 to the other with the recording function taking place only at the enabling wave. The gap 41 presents a high reluctance to the circumferential flux so that the circumferential flux passes through the tape 10. The circumferential flux developed by a pulse to the plated windings 54 and 55 alone is insufficient for effectively recording on the tape 10.

To illustrate the dimensions of the tracks and the spacing of successive pulses in adjacent transverse tracks, the magnetic tape 10 may be 2 inches in width and moving at a speed of 15 inches per second adjacent the transducer head 11. The successive transverse tracks are initiated at a 50 kilocycle rate so that the centerlines of the tracks are displaced by a distance of 0.3 mil. the distance the tape travels during 20 microseconds. The width of each of the transverse tracks may be 0.1 mil so that the distance between the edges of two adjacent tracks is 0.2 mil. What appears as a continuous line in the recorded curves is, therefore, a series of closely spaced pulses.

Each of the recorded pulses has a transverse dimension across the tape 10 and along the transverse track which depends upon the duration of the sampled pulse, the duration of the transverse wave and the speed of the transverse wave through the transducer head 11. With pulse and wave durations of 0.1 microsecond and a transverse wave speed of 7,500 feet per second, each sampled pulse is recorded along a distance of approximately 36 mils of a transverse track.

Due to a small delay introduced by the multivibrators, differentiating circuits, etc., and the toroidal winding 25, the pulses arrive at the plated windings 54 and 55 (FIGURE 2) slightly after the excitation of the transverse waves even when the sampled magnitudes are quite small. The duration for recording a transverse track across the 2 inch tape 10 is approximately 22.2 microseconds for a recording wave speed of 7,500 feet per second. Each successive transverse wave is initiated before its preceding track is fully recorded because the waves are excited at 20 microsecond intervals. Signals are not recorded in the overlapping periods in two successive tracks because the small delays for the pulses center them in a 16 microsecond recording range at the center of each 22.2 microsecond recording track.

As shown in FIGURE 4, the tape passes from the pay-out reel 14, also described above in reference to FIGURE 5, adjacent the transducer head 11 and then from the transducer head 11 to magnetic inking apparatus 62 which is part of the printing apparatus 9. Actually, the paths from the reel 14 to the transducer head 11 and from the head 11 to the apparatus 62 are not linear as described above in reference to FIGURE 5. A simplification of the path of the magnetic tape 10 is depicted in FIGURE 4 to illustrate its movement from the head 11 through the inking apparatus 62 to the take-up reel 15.

The printing apparatus 62 includes a blower, tank or other apparatus for dispersing magnetic particles or ink such as carbonyl powder or the like on the magnetized surface of the magnetic tape 10. After the tape 10, therefore, passes through the apparatus 62, the magnetic powder or solution is disposed on its surface in accordance with its magnetization. The latent images of the six curves depicted in FIGURE 7 on the tape 10 as recorded by the transducer head 11 are, therefore, visible as the tape 10 emerges from the apparatus 62.

As the tape 10 passes from the inking apparatus 62 to the take-up reel 15, it is pressed against a printing paper 67 which is moving at the same speed as the tape 10 and the same direction at the point of contact. The paper 67 is driven from a pay-out roll 65 between the rollers 68 and 66 together with the inked tape 10 and therefrom to a take-up roll 72. The paper 67 may be a wax or other type paper suitable for printing with the carbonyl powder or other magnetic ink. The take-up reel 15 for the tape 10 is driven by a motor 75 and the take-up roll 72 for the paper 67 may also be driven by the motor 75 through a linkage 73 or by a separate motor, not shown.

As the ink is transferred from the tape 10 to the paper 67, the tape 10 still retains the magnetic images of the coded curves so that additional prints may be readily provided.

Although this application has been disclosed and illustrated with reference to particular applications, the principles involved are susceptible of numerous other applications which will be apparent to persons skilled in the art. For example, the various dimensions of the tape and tracks are merely illustrative. The invention is, therefore, to be limited only as indicated by the scope of the appended claims.

I claim:

1. In an oscillograph for recording a graphic representation, corresponding to a varying signal on a moving recording medium, means for successively sampling the varying signal and for providing a pulse time modulated signal in accordance therewith, a stationary transducing member disposed across the recording medium in a direction transverse to the direction of movement of the medium and constructed to record information on the medium, and means coupled to the transducing member and to said sampling and providing means for obtaining a recording by the transducing member on the medium of each of the successive pulses of said pulse time modulated signal at a transverse position which is related to the time modulation of said pulse time modulated signal.

2. In an oscillograph for recording on a recording medium curves corresponding to a plurality of varying electrical signals, means for providing periodic enabling pulses, means for successively sampling the varying electrical signal and for providing a signal modulated in time from the reference signal in accordance with the characteristics of the varying electrical signal, a stationary transducer member coupled to said sampling and providing means and to said enabling means and disposed across the recording medium in a direction transverse to the direction of movement of the medium and constructed to record signals on the medium upon the enabling of the transducer member by the signals from the enabling means for successively recording signals at transverse positions on the medium dependent upon the time modulations of the signals from the sampling means, and means coupled to said sampling and providing means and to said transducer member for providing an individual coding for each signal recorded in representation of each varying electrical signal to distinguish between this signal and the other recorded signals representing the other varying electrical signals.

3. A transducing system for simultaneously recording on a movable recording medium a number of curves representing respectively a number of varying electrical quantities, including, means for periodically sampling each of said varying electrical quantities to provide a plurality of pulses each having a duration representative of the quantity at a progressive instant of time, a stationary transducer member disposed across said recording medium in a direction transverse to the direction of movement of the medium and coupled to said sampling means for recording each pulse of each of said series of pulses on said medium at a transverse position related to the duration of the pulse produced by said sampling and providing means and for providing such recording upon each enabling of the transducer member, and means coupled to said transducer member and to said sampling and providing means for simultaneously introducing said series of pulses for all of said varying quantities to said transducer member and to said sampling and providing means to obtain an enabling of said transducer member at the same time as the periodic samplings of said varying electrical quantities by said sampling and providing means.

4. In an oscillograph for recording a graphic representation corresponding to a variable signal on a movable recording medium, means for successively sampling the variable signal and for providing a pulse time modulated signal having a duration representative of the signal, switching means coupled to said sampling and providing means for interrupting said pulse time modulated signals in accordance with a predetermined pattern, stationary means coupled to said switching means and disposed across the recording medium in a transverse direction relative to the movement of the recording medium for recording each of the successive pulses of said interrupted pulse-time modulated signal on the moving recording medium at a transverse position related to its time position in said interrupted pulse-time modulated signal and for obtaining each recording upon the enabling of the stationary means, and means coupled to said stationary means and to said sampling means for synchronously enabling said stationary means and for obtaining sampling operations by said sampling means.

5. A recording system for recording on a movable recording medium a plurality of curves representing a plurality of variable signals, including, means for receiving the plurality of variable signals to be recorded, means coupled to said receiving means for successively sampling each of said variable signals and for successively providing for each of said variable signals a succession of pulses each having a duration related to the instantaneous magnitudes of the associated one of said variable signals, means coupled to said sampling and providing means for interrupting each succession of pulses in accordance with a distinctive pattern to provide a distinction between each succession of pulses and the other succession of pulses, a stationary transducer member disposed across said recording medium in a direction transverse to the direction of movement of the medium and coupled to said interrupting means for recording a signal on said medium for each of said pulses from said interrupting means at a transverse position related to the duration of the corresponding pulse from said sampling and providing means and for obtaining such recording upon the enabling of said transducer member, and synchronizing means coupled to said transducer member and to said sampling and providing means for enabling said transducer member at the same time that said sampling and providing means is operated to sample each of said varying signals.

6. A recording system for recording on a movable recording medium a curve representing a variable signal, including, means for receiving the variable signal to be recorded, means coupled to said receiving means for successively sampling sadi variable signal and for successively providing pulses having a duration related to the instantaneous magnitude of said varying signal, differentiating means coupled to said sampling and providing means for developing a pulse at the trailing edge of each of said pulses from said sampling and providing means, a stationary transducer member disposed across said recording medium in a direction transverse to the direction of movement of the medium and coupled to said sampling and providing means for recording a signal on said medium for each of said pulses from said differentiating means at a transverse position related to the time position of said pulse from said differentiating means and for obtaining such recordings upon the enabling of the transducer member, and synchronizing means coupled to said transducer member and to said sampling and providing means for enabling said transducer member and for obtaining a synchronous sampling by said sampling and providing means for the production of a pulse.

7. A recording system for recording on a movable recording medium a plurality of curves representing a plurality of variable signals, including, means for receiving the plurality of variable signals to be recorded, means coupled to said receiving means for successively sampling each of said variable signals and for successively providing for each of said variable signals a succession of pulses each having a duration related to the instantaneous magnitudes of the associated one of said variable signals, means coupled to said sampling and providing means for differentiating the pulses in each of said succession of pulses from said sampling and providing means, means coupled to said differentiating means for interrupting each succession of differentiated pulses in accordance with an individual pattern, a stationary transducer member disposed across said recording medium in a direction transverse to the direction of movement of the medium and coupled to said interrupting means for recording a signal on said medium for each of said pulses from said interrupting means at a transverse position corresponding to the duration of the pulse from said sampling and providing means and for providing such recording upon the enabling of the stationary transducer member, and synchronizing means coupled to said transducer member and to said sampling and providing means for enabling said transducer member at the same time that said sampling and providing means is operated to sample each of said varying signals.

8. A recording system for recording on a movable recording medium a plurality of curves representing a plurality of variable signals, including, means for receiving the plurality of variable signals to be recorded, means coupled to said receiving means for successively sampling each of said variable signals and for successively providing for each of said variable signals a succession of pulses each having a duration related to the instantaneous magnitudes of the associated one of said variable signals, means coupled to said sampling and providing means for differentiating the pulses in each of said succession of pulses from said sampling and providing means, means coupled to said differentiating means for interrupting each succession of differentiated pulses in accordance with an individual pattern, a stationary transducer member disposed across said recording medium in a direction transverse to the direction of movement of said recording medium and coupled to said interrupting means for recording a signal on said medium at a transverse position corresponding to the duration of each of said pulses from said interrupting means and for obtaining such recording upon the enabling of the transducer member, and synchronizing means coupled to said transducer member and to said sampling and providing means for enabling said transducer member at the same time that said sampling and providing means is operated to sample each of said variable signals.

9. The combination set forth in claim 8 in which the recording medium is magnetic and in which means are coupled to said magnetic recording medium for coating said magnetic recording medium with a magnetic powder having properties of adhering to the recorded positions on the recording medium to provide a visual indication of the recorded signals.

10. In an oscillograph for recording on a movable recording medium a curve corresponding to a varying electrical signal, means for successively sampling the varying electrical signal and for providing a pulse time modulated signal in accordance therewith; said sampling and providing means having a variable pulse width multivibrator for providing a succession of pulses each having a duration related to the instantaneous magnitude of the varying electrical signal at a progressive instant of time, a differentiating circuit coupled to said multivibrator for deriving a pulse at the trailing edge of each of the successive pulses provided by said multivibrator; a stationary transducer member coupled to said differentiating circuit of said sampling and providing means and disposed across the medium in a direction transverse to the direction of movement of the medium for successively recording the differentiated pulses on the recording medium upon the successive enablings of the transducer member, and means coupled to said sampling and providing means and to said transducer member for introducing enabling pulses simultaneously to the transducer member and to the sampling and providing means to obtain a synchronous enabling of the transducer means and the synchronous production of pulses by the sampling and providing means.

References Cited in the file of this patent

UNITED STATES PATENTS

| | | |
|---|---|---|
| Re. 23,919 | Hawkins | Jan. 11, 1955 |
| 2,245,286 | Marzocchi | June 10, 1941 |
| 2,841,461 | Gleason | July 1, 1958 |
| 2,884,341 | Kulesya | Apr. 28, 1959 |
| 2,907,621 | Eisler et al. | Oct. 6, 1959 |
| 2,921,989 | Serrell | Jan. 19, 1960 |

OTHER REFERENCES

Ferromagnetography High Speed, G.E. Review, July 1952, pp. 20, 21, 22 and 61.